United States Patent
Rakshit et al.

(10) Patent No.: US 11,392,188 B1
(45) Date of Patent: Jul. 19, 2022

(54) MAINTAINING SMART CONTACT LENS POWER LEVELS

(71) Applicant: International Business Machines Corporation, Armonk, NY (US)

(72) Inventors: Sarbajit K. Rakshit, Kolkata (IN); Katsuyuki Sakuma, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/142,305

(22) Filed: Jan. 6, 2021

(51) Int. Cl.
- *G06F 1/26* (2006.01)
- *G05B 19/042* (2006.01)
- *G06T 11/00* (2006.01)
- *G06F 3/01* (2006.01)

(52) U.S. Cl.
CPC ......... *G06F 1/266* (2013.01); *G05B 19/0426* (2013.01); *G06F 3/013* (2013.01); *G06T 11/00* (2013.01); *G05B 2219/25356* (2013.01); *G05B 2219/25425* (2013.01)

(58) Field of Classification Search
CPC ..... G06F 1/266; G06F 3/013; G05B 19/0426; G06T 11/00
See application file for complete search history.

(56) References Cited

U.S. PATENT DOCUMENTS

| | | |
|---|---|---|
| 10,231,614 B2 | 3/2019 | Krueger |
| 2016/0299354 A1 | 10/2016 | Shtukater |
| 2018/0036974 A1 * | 2/2018 | Hahn .................. G02C 7/04 |
| 2018/0074330 A1 | 3/2018 | Callahan |
| 2019/0293964 A1 * | 9/2019 | Takaki .................. G02B 5/00 |
| 2019/0331937 A1 | 10/2019 | Owens |
| 2020/0018990 A1 | 1/2020 | Mirjalili |
| 2020/0343775 A1 | 10/2020 | Yahagi et al. |
| 2021/0320335 A1 * | 10/2021 | Horibe .................. H01M 4/134 |

FOREIGN PATENT DOCUMENTS

| | | |
|---|---|---|
| CN | 201945750 U | 8/2011 |
| CN | 202159184 U | 3/2012 |
| CN | 103272329 A | 9/2013 |
| CN | 109982660 A | 7/2019 |
| CN | 11156689 A | 8/2020 |
| EP | 30514101 A | 8/2016 |
| IN | 201911010062 A | 8/2019 |
| WO | 2018052989 W | 3/2018 |

OTHER PUBLICATIONS

International Search Report and Written Opinion dated Apr. 16, 2022 from PCT Application No. PCT/CN2022/070311 filed Jan. 5, 2022.

(Continued)

*Primary Examiner* — Terrell S Johnson
(74) *Attorney, Agent, or Firm* — David K. Mattheis; Maeve Carpenter

(57) ABSTRACT

Maintaining a smart contact lens power level by receiving smart contact lens power level data, determining a smart contact lens power level need according to the power level data, and instigating relative motion between a smart contact lens induction coil and a static magnetic field to meet the smart contact lens power level need.

20 Claims, 5 Drawing Sheets

(56) References Cited

OTHER PUBLICATIONS

"Electricity explained, Magnets and electricity", U.S. Energy Information Administration (EIA), last updated Jan. 8, 2020, 2 pages, <https://www.eia.gov/energyexplained/electricity/magnets-and-electricity.php>.

"Eye Exercise", Stretch Now, 2 pages, retrieved from the Internet on Mar. 24, 2020, <https://www.stretchnow.com.au/eye-exercise>.

"Improving patient outcomes with smart implants", RENISI, Feb. 5, 2018, 3 pages, <https://www.renishaw.com/en/improving-patient-outcomes-with-smart-implants--43124>.

"Smart, self-powered knee implants could reduce number of knee replacement surgeries", ScienceDaily, Jan. 29, 2019, Binghamton University, 5 pages, <https://www.sciencedaily.com/releases/2019/01/190129124809.htm>.

"Step-By-Step Blinking Exercises", Shady Grove Eye and Vision Care, retrieved from the Internet on Mar. 24, 2020, 7 pages, <https://youreyesite.com/blinking-exercises-you-can-try-for-greater-eye-comfort/>.

Bolton, Doug, "Samsung Patents Design for 'Smart' Augmented Reality Contact Lenses", Wednesday, Apr. 6, 2016, Independent, 3 pages, <https://www.independent.co.uk/life-style/gadgets-and-tech/news/samsung-smart-contact-lenses-patent-a6971766.html>.

Edgy Universe, "The Future of AR: Video Recording Contact Lenses", Jun. 17, 2019, 11 pages, <https://edgy.app/sony-video-contact-lens>.

Elgan, Mike, "Why a smart contact lens is the ultimate wearable", May 9, 2016, Computerworld, 6 pages, <https://www.computerworld.com/article/3066870/why-a-smart-contact-lens-is-the-ultimate-wearable.html>.

Flanigan, Tara, Mashable, "These futuristic contact lenses could record video in a blink of an eye", video, Jun. 8, 2017, 6 pages, <https://mashable.com/2017/06/08/smart-contact-lenses-record-video/>.

Mell et al., "The NIST Definition of Cloud Computing", Recommendations of the National Institute of Standards and Technology, Special Publication 800-145, Sep. 2011, 7 pages.

Meyler, Zinovy, DO, "Stretches and Exercises for Neck Pain and Dizziness", updated Feb. 27, 2019, 3 pages, <https://vww.spine-health.com/conditions/neck-pain/stretches-and-exercises-neck-pain-and-dizziness>.

Niroomand, et al., "A rotary electromagnetic microgenerator for energy harvesting from human motions", Journal of Applied Research and Technology 14 (2016) 259-267, 9 pages, Received Jan. 22, 2016; accepted Jun. 6, 2016 Available online Jul. 31, 2016, <http://dx.doi.org/10.1016/j.jart.2016.06.002>.

Platt et al., "The Use of Piezoelectric Ceramics for Electric Power Generation Within Orthopedic Implants", IEEE/ASME Transactions On Mechatronics, vol. 10, No. 4, Aug. 2005, pp. 455-461.

Zyga, Lisa, "Self-powered e-watch is powered completely by wrist movements", Nov. 23, 2015, 2 pages, retrieved Jan. 21, 2020 from <https://phys.org/news/2015-11-self-powered-e-watch-powered-wrist-movements.html>.

\* cited by examiner

MAINTAINING SMART CONTACT LENS POWER LEVELS

BACKGROUND

The disclosure relates generally to maintaining smart contact lens power levels. The disclosure relates particularly to maintaining smart contact lens levels using augmented reality.

Smart contact lenses may include wireless connectivity with external systems capabilities enabling the transfer of data to and from the lens. Smart contact lenses may include electronic circuits enabling the measurement of biometric data—glucose level in tears, interocular pressure, for example—as well as enabling the capture of images within a user's field of view, and presentation of images from a computing system to the user. Such electronic circuits require power. Some smart contact lenses may include a power storage module as well as a power generation system. The power generation system may include an induction coil which will generate electrical power when moved within a magnetic field.

SUMMARY

The following presents a summary to provide a basic understanding of one or more embodiments of the disclosure. This summary is not intended to identify key or critical elements or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatuses and/or computer program products enable maintaining smart contact lens power levels.

Aspects of the invention disclose methods, systems and computer readable media associated with maintaining a smart contact lens power level by receiving smart contact lens power level data, determining a smart contact lens power level need according to the power level data, and instigating relative motion between a smart contact lens induction coil and a static magnetic field to meet the smart contact lens power level need.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
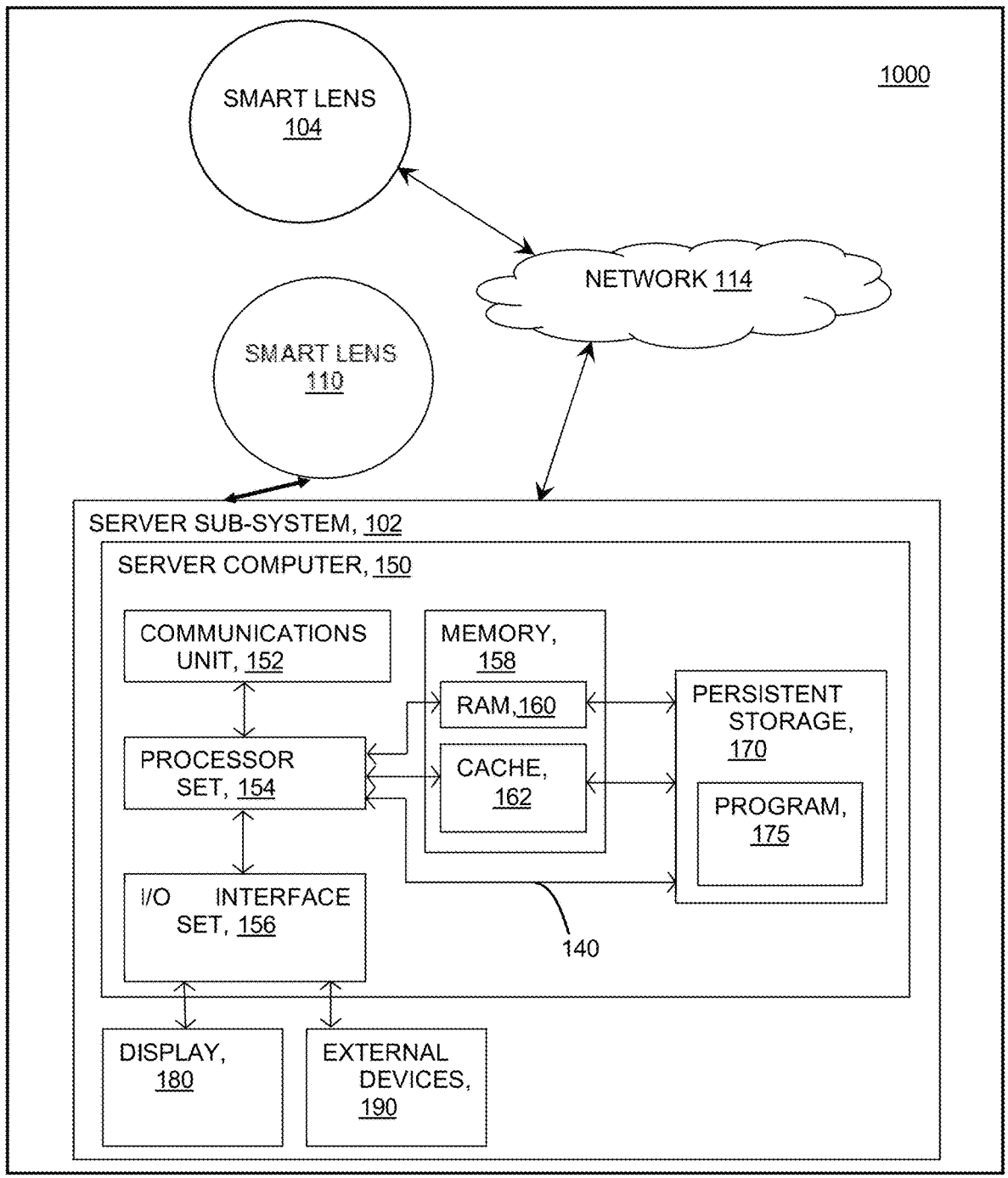
FIG. 1 provides a schematic illustration of a computing environment, according to an embodiment of the invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

In an embodiment, one or more components of the system can employ hardware and/or software to solve problems that are highly technical in nature (e.g., receiving smart contact lens power level data, determining smart contact lens power level needs, initiating relative motion between smart contact lens induction coil and a magnetic field, etc.). These solutions are not abstract and cannot be performed as a set of mental acts by a human due to the processing capabilities needed to facilitate maintaining smart contact lens power levels, for example. Further, some of the processes performed may be performed by a specialized computer for carrying out defined tasks related to maintaining power levels. For example, a specialized computer can be employed to carry out tasks related to initiating motion to maintain smart contact lens power levels or the like.

In one aspect disclosed embodiments relate to a system wherein a user's physical and mental states are monitored. In such embodiments, the system initiates combinations of head, neck and eye movements to reduce physical and mental fatigue for the user. The system may monitor a user's field of view using a smart contact lens and may interpret a fixed gaze as an indication of mental fatigue. The system may receive and monitor a user's posture and other physical attributes using data received from a networked camera. The system may prompt the user to initiate head/neck/eye movements to reduce the fatigue. The system may prompt the user through an augmented reality indicium presented at a particular location in the user's field of view using the display capacities of the smart contact lens. The system may utilize a networked remote device, such as a remote speaker, lighting device, or similar device connected to the system via a wired or wireless network to prompt the user to move their head/neck or eyes.

In one aspect disclosed embodiments relate to systems and methods for maintaining smart contact lens power levels. Such embodiments include a processor in wireless communication with a smart contact lens. The smart contact lens includes one or more induction coils, a power storage unit and a power level detection circuit, together with wireless communication circuits connected to the processor. In operation the smart contact lens uses stored electric power to activate sensing, display or other operational circuits. The power level detection circuitry measures the remaining amount of stored power. The smart contact lens communicates the remaining amount of stored power to the processor. The processor evaluates the remaining amount of stored power, against a fixed threshold or against a prediction of power needed for future activities and determines if the smart contact lens requires additional power. In an instance where the smart contact lens requires additional power, the system initiates activities which result in relative motion between the one or more induction coils of the smart contact lens and magnetic fields present in the local environment.

In an embodiment, the method predicts future power usage for the smart contact lens. In this embodiment, the method tracks smart contact lens power usage over time and determines the power usage associated with respective smart contact lens activities, such as biometric measurements, data transfer, image capture and transfer, image presentation, etc. The method analyzes power usage and activity data to determine trends in power usage by the smart contact lens such as temporal trends wherein particular portions of a day or of a week result in consistent usage of power by the smart contact lens. Other trends associated with user activities may also be tracked such as high-power usage while using an augmented reality image display. The method may then predict future power usage for the smart contact lens using one or more of the time-based trends and activity-based trends. The method may determine that additional power will be needed by the smart contact lens in the near future and may then initiate the relative motion between the induction coil(s) of the smart contact lens and the environmental magnetic field(s) to generate the predicted power amounts.

In an embodiment, the system and method detect the current remaining power level and the current rate of power use and determine how quickly additional power will be required by the smart contact lens performing the current task. The method compares the determined time to a preset threshold value and for predicted times less than the threshold value, the method initiates relative motion inducing activities for the smart contact lens user.

In an embodiment, the system includes one or two smart contact lenses. A single contact lens may be used in instance where a user does not require vision correction and utilizes the smart contact lens for biometric or augmented reality image capture and image display. A pair of lenses may also be used for biometric and augmented reality activities with and without also providing vision correction for the user. References herein to a single smart contact lens or to multiple smart contact lenses are to be construed as including each of a single smart contact lens and a pair of smart contact lenses.

In an embodiment, the local environment includes one or more magnets, such as neodymium or ferrite permanent magnets yielding magnetic fields. Such magnets may be incorporated into clothing or accessories including necklaces, decorative pins etc. The movement of the smart contact lens relative to the magnetic field(s) in the environment results in the generation of an electromotive force in the induction coils, and an associated current and voltage, enabling the charging of the power storage module of the smart contact lens. In an embodiment, the method initiates the relative motion by prompting the user to move their head, or to move their eyes. The nature of the initiated motion may depend upon the source of the environmental magnets. As an example, a magnet disposed within a user's hat requires eye movements as head movements will not necessarily yield relative motion between the user's eyes and the magnet in the hat. As another example, either eye movements or head movements yield relative motion between smart contact lenses and an environmental magnet disposed in the collar of a user's clothing or within a user's necklace.

In an embodiment, a system includes one or more smart contact lenses communicating with one or more processors and/or internet of things (IoT) devices. The smart contact lens includes a power module including a power storage element such as a re-chargeable battery, and a power charging circuit including one or more induction coils coupled to the power storage element and charging circuit. The smart contact lens includes a communication module enabling paired communications with the one or more processors and IoT devices. The communication may be way of WIFI, NFC, BLUETOOTH, BLUETOOTH LE, or other communications protocols. (Note: the terms "WIFI", "NFC", "BLUETOOTH", and "BLUETOOTH LE", may be subject to trademark rights in various jurisdictions throughout the world and are used here only in reference to the products or services properly denominated by the marks to the extent that such trademark rights may exist.)

In this embodiment, the power storage module includes a capability to monitor power levels in terms of voltage or other metrics and the smart contact lens includes the capability to communicate stored power level data to external devices such as the processor or IoT devices. The power level data may include an absolute value for the power storage voltage, or a relative value for power level such as a percentage of maximum stored power remaining, e.g., 40% power remaining.

In an embodiment, a processor receives power level data from the smart contact lens over a communications channel. The received power level data may include a power storage voltage level or a percentage of maximum available power remaining in the power storage module. In one aspect the processor receives power level data including the power storage voltage and determines a battery capacity remaining percentage according to the received voltage data.

In this embodiment, the method executed by the processor determines power level needs of the smart contact lens relative to the received power level data. For example, the method may determine that current user activities will require 35% of the available battery capacity over the next 60 minutes, based upon historic power consumption data associated with the current activity, such as historic data indicating an average power consumption of 35% of available capacity for viewing a computer display monitor for 60 minutes. Alternatively, the method may determine future power level needs using the time of day and day of the week data from the processor. For example, historic data may indicate that power use for Monday morning between 9 and 10 am averages 30% of available power storage capacity and the method may predict that power usage over the next 60 minutes will reach or exceed that 30% value for any Monday between 9 and 10 am.

In an embodiment, the system and method receive ongoing power level data from the smart contact lens(es) and adds the power level data to a data base including calculations of time based power usage including time of day, day of week and power usage over time, such as tracking the power usage every second or few seconds, every minute, five minutes, 30 minutes, 60 minutes, etc., over the course of each day of the week.

In an embodiment, the power level data may also include activity data from the smart contact lens, such as data indicating biometric measurement activity, augmented reality image capture activity, augmented reality image presentation activity, for each provided power level data. As an example, the smart contact lens may provide power level data indicating a current power storage voltage of 1.2 volts, with a current activity of image presentation for the lens(es). In this embodiment, the method may aggregate and track data by activity—such as aggregating image display power consumption over a period of two minutes with an associated power consumption indicated by changes in power module voltage levels. The method may store power consumption data associated with each of the time of day, day of the week, as well as power consumption for image display.

The method may analyze the accumulated time series data by activity as well as by time of day and day of the week. The method may utilize a long short-term memory (LSTM) recurrent neural network model, or similar machine learning model architecture, to analyze the time series power level and smart contact lens activity data and to identify power consumption and user activity trends including average power consumption for particular activities and/or times of the day and days of the week. The analysis yields trend data providing a basis for predicting power level needs for future time frames for particular activities, either current user activities or predicted activities based upon historical data analysis.

For example, the analysis may identify power usage trends for particular times of the day and days of the week and may further identify user activity trends such as image capture and image presentation activity trends with accompanying power level consumption needs. Such activity trends may be associated with particular times of day, days of the week or may be time independent.

In an embodiment, the machine learning model continuously updates by ongoing analysis of received smart contact lens power level and activity data. In addition to the ongoing analysis of the power level data, the system and method determines the capacity of the smart contact lens power storage module to meet predicted power level needs. For example, received power level data indicates 35% of maximum storage capacity remaining, either directly or by processor analysis of received power module voltage data. Based upon the historic data analysis and current activity and time data, the method predicts a power level need of 40% for the time frame considered. The method determines a need for power system charging activity to accommodate the predicted power shortage.

In this embodiment, power system charging activity includes instigating relative motion between a smart contact lens and its induction coil(s) and the environmental magnetic fields. The relative motion of the coil and the environmental magnetic field(s) induces electric current in the coil(s) resulting in an electromotive force (voltage) applied to the power module charging circuit and charging the power storage element of the smart contact lens. As the smart contact lens power storage element charges, the new power level data received from the smart contact lens reflects the increases in the stored power. The system monitors the updates to the stored power level and determines updated smart contact lens power level needs as described above.

In an embodiment, the method instigates the relative motion by providing a prompt to the user to move their head or eyes relative to the environmental magnetic field(s). Exemplary head exercises include flexing and extending the neck muscles moving the head forward and backward, tilting the head from one side to the other and rotating the head. Exemplary eye exercises include shifting the eyes side to side to shift the field of view to the full extent of the user's peripheral vision field, shifting the eyes up and down to the extent of the user's field of view and shifting both eyes toward the center of the user's field of view. Each of these exercises yielding relative motion between the smart contact lens induction coil(s) and the environmental magnetic field(s).

In an embodiment, the method and system provide the user exercise prompts using a display associated with the processor, such as a computer display or the display of a smart phone. In an embodiment, the system and method utilize remote connected IoT devices, such as a networked lamp or audio speaker to prompt the user to move their head/eyes. For example, the method and system may turn a networked lamp located at the periphery of the user's field of view on and off, prompting the user to shift their eyes or their head to bring the lamp into the center of their field of view. The method may send an audio signal to a networked IoT speaker to prompt the user to turn their head or shift their eyes to look at the speaker.

In an embodiment, the system and method utilize the display capabilities of the smart contact lens to provide a prompt to the user instigating the relative motion of the smart contact lens induction coil(s) and the environmental magnetic field(s). As an example, the method and system send a signal to the smart contact lens triggering the display of an augmented reality image or indicia upon the display area of the lens. The indicia may appear as a bi-directional arrow in the center of the user's field of view prompting the user to move their head or eyes up and down or left to right in response to the arrow, or a ring shaped arrow prompting the user to rotate their head. The indicia may be displayed at or near the edge of the user's peripheral vision field prompting the user to turn their head or shift their eyes toward the indicia. As a response to the eye movement or head shift, detected by changes in the induction coil current and communicated to the processor, the method and system alters the displayed position of the augmented reality indicia. The alteration in the displayed position corresponds to the eye shift or head movement to present the appearance that the augmented reality indicia is fixed in space and the by shifting their eyes or turning their head the user has altered the position of the indicia in their field of view.

In an embodiment, the method utilizes digital objects associated with the user's current activity, rather than an AR indicium. For example, during a video call or other image display activity, the method shifts the display location of the digital object inducing the user to shift their gaze—generating relative motion between the coils and the magnetic fields. In this embodiment, the method shifts the display from the center of the user's field of view to the right, left, up, or down, or a combination of these such as to the left and down, inducing the user to shift their gaze. The method detects the changes in gaze using the smart contact lens and shifts the display of the digital object as described above, to provide the appearance that the digital object resides in a fixed location and the user can shift it to the center of their field of view by altering their gaze. As an example, the method displays the AR indicia at the far-right edge of the user's field of view. The method tracks changes in the user's gaze due to motion of the head or the eyes, using feedback from the smart contact lens. The method alters the display location of the indicia according to the gaze data such that the absolute position of the indicia appears to remain the same as the user alters their gaze.

In an embodiment, the method tracks the power generating effectiveness of each instigated motion. The method records the amount of power per unit time each type of instigated motion generates. In this embodiment, the method utilizes the amount of power generated by each motion as a selection criterium in determining which motion to instigate to meet a determined power level need. The method selects a motion capable of meeting the predicted power level need in the time available to meet the need. The method presents a display to the user indicating the exercise(s) to be performed to generate the needed power level.

In an embodiment, the system and method track the user's eye and head/neck movements, as well as changes in the user's eye focus within the field of view. The method monitors cumulative user head/neck and eye movements and compares the cumulative motions against thresholds to determine if the user has performed sufficient exercises to avoid becoming fatigued and to avoid eye strain. For example, when the method determines that the user has not performed sufficient head/neck movements to avoid fatigue, the method instigates head/neck movements as described above. The method may further analyze data from IoT devices, such as an external camera monitoring the user, to determine if the user's posture has shifted from optimal or if the user has remained in a fixed position for a time frame exceeding a threshold for movement associated with avoiding fatigue due to inactivity. In this embodiment, user level of fatigue may be inferred from changes in the user's posture over time. In this embodiment, the method instigates head/neck and eye movements as described above to prevent the inset of user fatigue from inactivity.

In an embodiment, the method monitors user head/neck and eye movements in conjunction with the time-based power level requirements, described above. In this embodiment, the method coordinates fatigue reducing motions with power level needs such that the user avoids fatigue and eye strain while concurrently moving enough to provide needed smart contact lens power levels. As an example, analysis of historic data indicates that a user must perform five minutes of head/neck movements per hour to avoid fatigue and must also perform five minutes of head/neck movements to generate the necessary smart contact lens power level for the activities associated with the next hour of the day. The method instigates the five minutes of exercise to avoid fatigue and generate the needed power levels.

FIG. 1 provides a schematic illustration of exemplary network resources associated with practicing the disclosed inventions. The inventions may be practiced in the processors of any of the disclosed elements which process an instruction stream. As shown in the figure, a networked Smart lens 110 connects wirelessly to server sub-system 102. Smart lens 104 connects wirelessly to server sub-system 102 via network 114. Smart lenses 104 and 110 comprise application program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the power level maintenance program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of smart lenses 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., power level maintenance program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
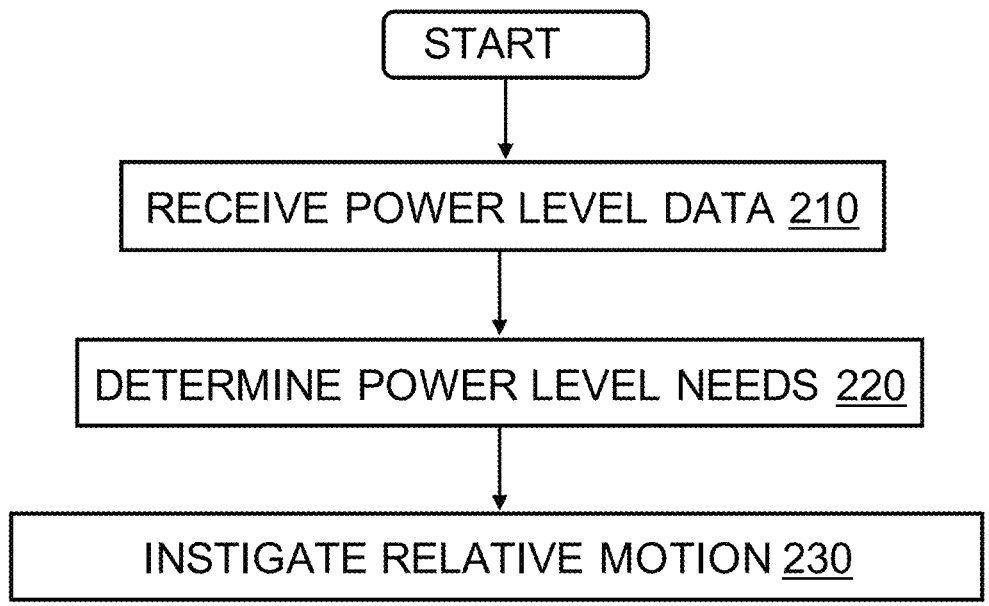
FIG. 2 provides a flowchart depicting an operational sequence, according to an embodiment of the invention.

FIG. 2 provides a flowchart 200, illustrating exemplary activities associated with the practice of the disclosure. After program start, at block 210, the method of power level maintenance program 175, receives power level data from one or more smart contact lenses. The power level data may include power storage element voltage data, or a data indicating a determined power level remaining, for the power storage element. At block 220, the power level maintenance program 175 determines a power level need for the one or more smart contact lenses. The power level need may be determined according to current or projected smart contact lens activities. Predicted smart lens activities and associated power level needs may be determined according to an analysis of historic smart lens activity data, as analyzed by a machine learning model such as an LSTM machine learning model.

At block 230, the method of the power level maintenance program 175 instigates relative motion between the one or more smart contact lenses and environmental magnetic fields. The method may prompt a user to move their head/neck to instigate the relative motion. The method may prompt the user to move their eyes relative to the environmental fields to generate power through induction. As the motion occurs, the method monitors the smart lens power levels and makes an ongoing series of determinations of the need for continued relative motion to generate power for the lens(es).

In an embodiment, the method tracks the relative effectiveness of each instigated motion in generating power over time. The method tracks the power per unit time generated for the smart lens(es) as each relative motion occurs. The method ranks each of the relative motions according to power generating effectiveness. In this embodiment, the method selects a relative motion to generate power according to the relative effectiveness of the motion at generating power and the amount of power needed. For example, circumstances where large quantities of power are predicted as needed in a short period of time result in the instigation of relative motion through a motion most likely to generate the available amount of power in the required amount of time.

Figure 3:
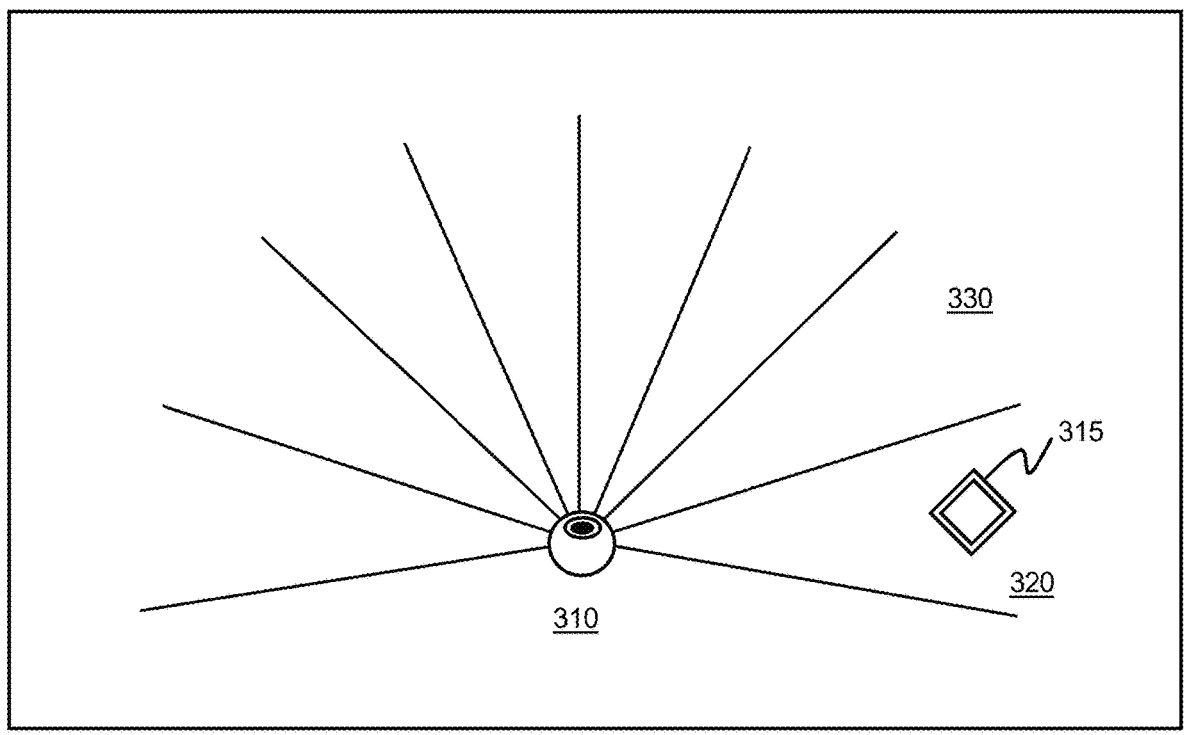
FIG. 3 depicts augmented reality item display, according to an embodiment of the invention.

Schematic 300 of FIG. 3 illustrates a display of augmented reality indicium 315, within the peripheral field of view portion 320, of a user. As the user responds to the display of the augmented reality indicium 315, by turning their head or by shifting their eyes, the method receives eye gaze or head position feedback from the smart contact lens and alters the position of the augmented reality indicium 315 in response. The method shifts the display location of indicium 315 across the field of view, from peripheral portion 320, to the next portion 330 and so on as the user continues to alter their gaze.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
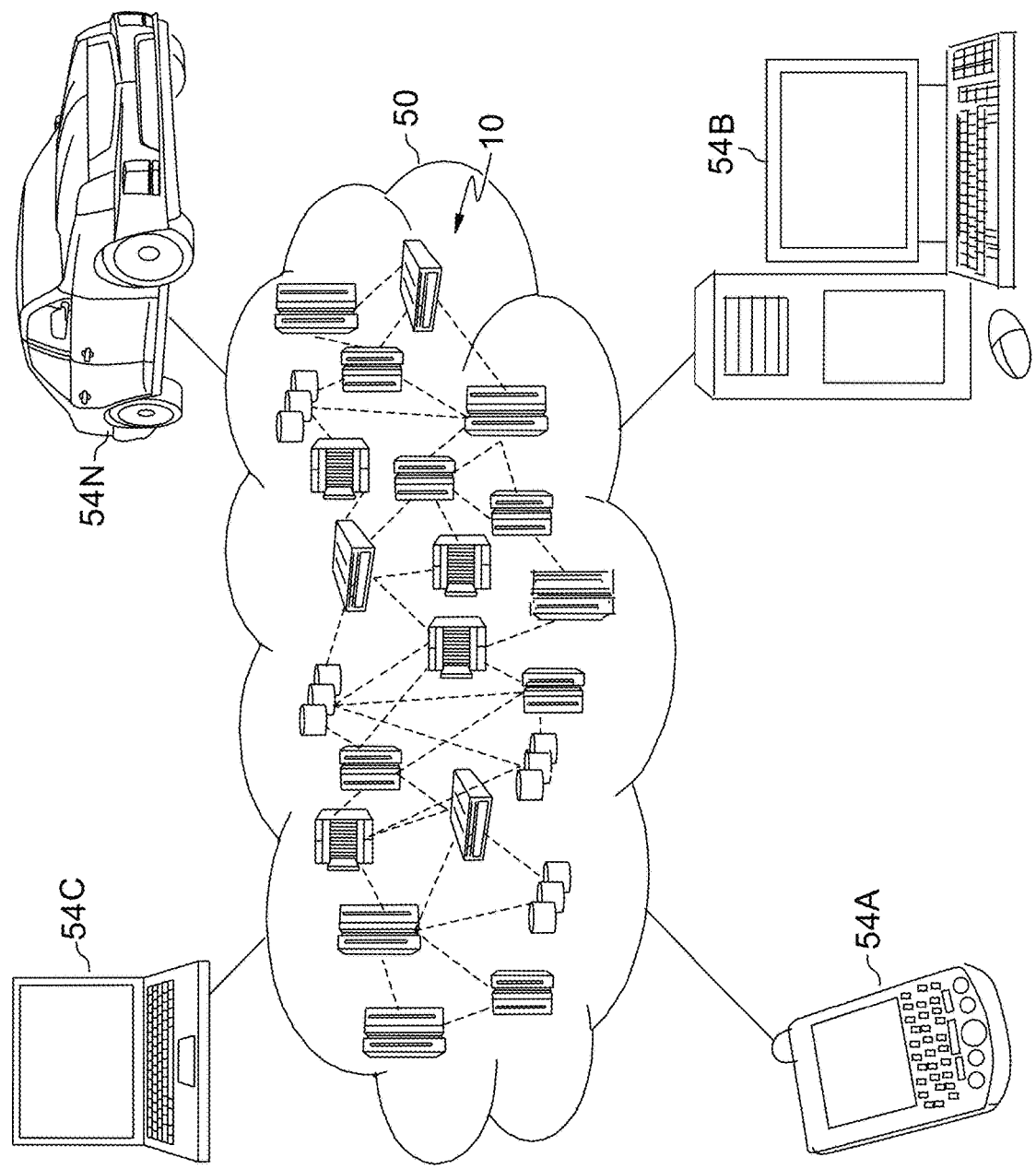
FIG. 4 depicts a cloud computing environment, according to an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
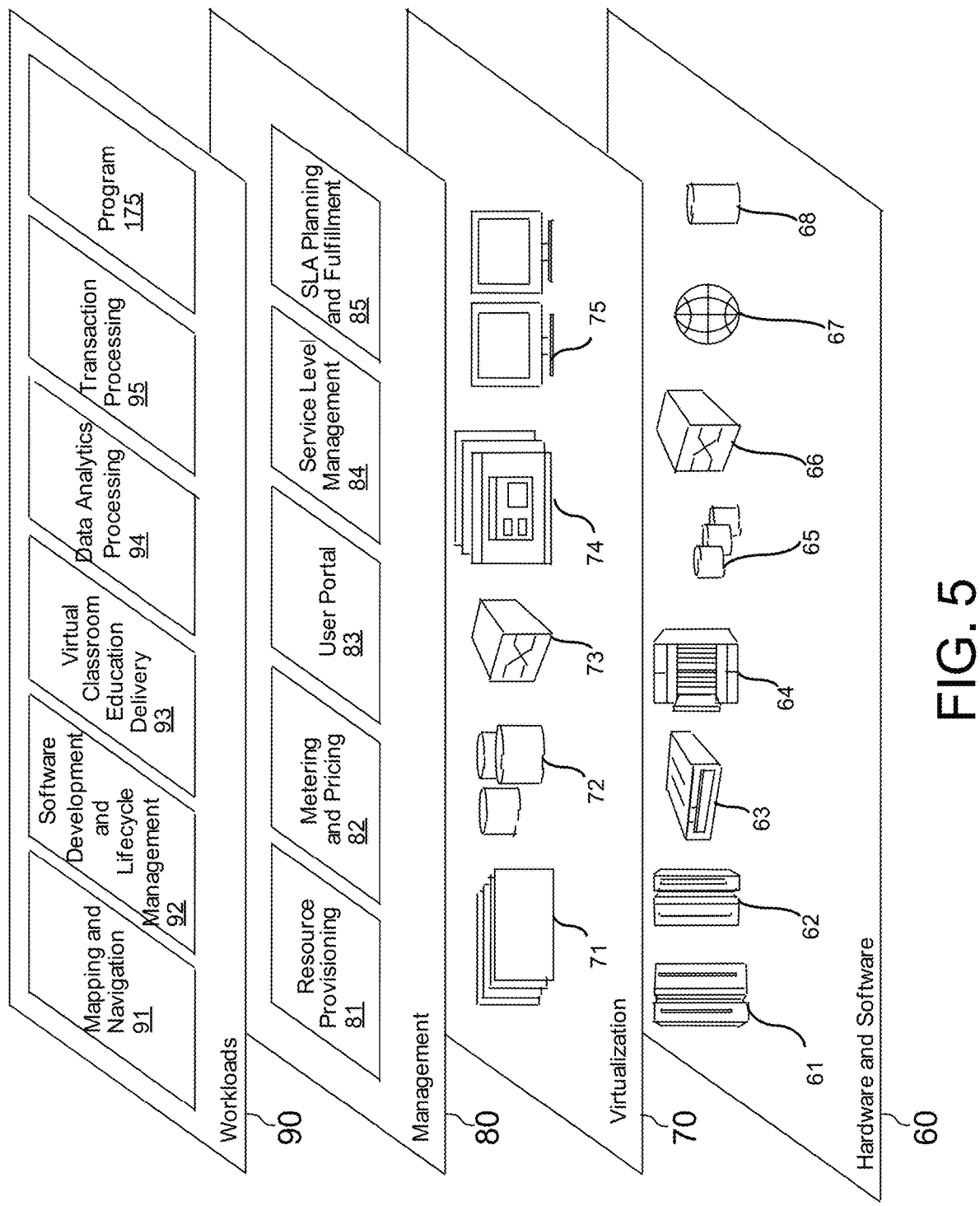
FIG. 5 depicts abstraction model layers, according to an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and power level maintenance program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, or computer readable storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions collectively stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for maintaining a smart contact lens power level, the method comprising:
   receiving, by one or more computer processors, smart contact lens power level data;
   determining, by the one or more computer processors, a smart contact lens power level need according to the power level data; and
   instigating, by the one or more computer processors, relative motion between a smart contact lens induction coil and a static magnetic field to meet the smart contact lens power level need.

2. The computer implemented method according to claim 1, wherein instigating relative motion comprises prompting a user to move their head or eyes.

3. The computer implemented method according to claim 1, wherein instigating the relative motion comprises prompting user activity according to a user fatigue level.

4. The computer implemented method according to claim 1, wherein instigating relative motion comprises projecting augmented reality indicia within a user's field of view.

5. The computer implemented method according to claim 4, further comprising altering, by the one or more computer processors, a projected location of the augmented reality indicia according to a motion of a user's eye.

6. The computer implemented method according to claim 1, wherein instigating relative motion comprises prompting user eye movement using a remote device.

7. The computer implemented method according to claim 1, further comprising determining, by the one or more computer processors, a smart contact lens power level need according to a power consumption prediction.

8. A computer program product for maintaining a smart contact lens power level, the computer program product comprising one or more computer readable storage devices and collectively stored program instructions on the one or more computer readable storage devices, the stored program instructions comprising:

program instructions to receive smart contact lens power level data;

program instructions to determine a smart contact lens power level need according to the power level data; and program instructions to instigate relative motion between a smart contact lens induction coil and a static magnetic field to meet the smart contact lens power level need.

9. The computer program product according to claim 8, wherein instigating relative motion comprises prompting a user to move their head or eyes.

10. The computer program product according to claim 8, wherein instigating the relative motion comprises prompting user activity according to a user fatigue level.

11. The computer program product according to claim 8, wherein instigating relative motion comprises projecting augmented reality indicia within a user's field of view.

12. The computer program product according to claim 11, further comprising altering a projected location of the augmented reality indicia according to a motion of a user's eye.

13. The computer program product according to claim 8, wherein instigating relative motion comprises prompting user eye movement using a remote device.

14. The computer program product according to claim 8, the stored program instructions further comprising program instructions to determine a smart contact lens power level need according to a power consumption prediction.

15. A computer system for maintaining a smart contact lens power level, the computer system comprising:

one or more computer processors;

one or more computer readable storage devices; and stored program instructions on the one or more computer readable storage devices for execution by the one or more computer processors, the stored program instructions comprising:

program instructions to receive smart contact lens power level data;

program instructions to determine a smart contact lens power level need according to the power level data; and program instructions to instigate relative motion between a smart contact lens induction coil and a static magnetic field to meet the smart contact lens power level need.

16. The computer system according to claim 15, wherein instigating relative motion comprises prompting a user to move their head or eyes.

17. The computer system according to claim 15, wherein instigating the relative motion comprises prompting user activity according to a user fatigue level.

18. The computer system according to claim 15, wherein instigating relative motion comprises projecting augmented reality indicia within a user's field of view.

19. The computer system according to claim 15, wherein instigating relative motion comprises prompting user eye movement using a remote device.

20. The computer system according to claim 15, the stored program instructions further comprising program instructions to determine a smart contact lens power level need according to a power consumption prediction.

\* \* \* \* \*